(12) United States Patent
Scerbak et al.

(10) Patent No.: US 7,306,376 B2
(45) Date of Patent: Dec. 11, 2007

(54) MONOLITHIC MODE STRIPPING FIBER FERRULE/COLLIMATOR AND METHOD OF MAKING SAME

(75) Inventors: David Gerald Scerbak, Traverse City, MI (US); Gordon Edgar Gottfried, Traverse City, MI (US); Eric Sean Pooler, Traverse City, MI (US); Evan Matthew Rogers, Saline, MI (US)

(73) Assignee: Electro-Optics Technology, Inc., Traverse City, MI (US)

( * ) Notice: Subject to any disclaimer, the term of this patent is extended or adjusted under 35 U.S.C. 154(b) by 0 days.

(21) Appl. No.: 11/338,429

(22) Filed: Jan. 23, 2006

(65) Prior Publication Data

US 2007/0172174 A1      Jul. 26, 2007

(51) Int. Cl.
    *G02B 6/36*      (2006.01)
(52) U.S. Cl. ................... 385/76; 385/77; 385/78; 385/79; 385/85
(58) Field of Classification Search ............ 385/33, 385/76–78, 80, 62, 60, 56, 58, 88–91; 362/101
    See application file for complete search history.

(56) References Cited

U.S. PATENT DOCUMENTS

| | | | |
|---|---|---|---|
| 4,575,181 A | 3/1986 | Ishikawa | |
| 4,678,273 A | 7/1987 | Vilhelmsson | |
| 4,737,006 A | 4/1988 | Warbrick | |
| 4,945,457 A * | 7/1990 | Yazdani et al. | 362/101 |
| 5,291,570 A * | 3/1994 | Filgas et al. | 385/78 |
| 5,619,602 A | 4/1997 | Sandstrom et al. | |
| 6,033,515 A | 3/2000 | Walters et al. | |
| 6,167,177 A | 12/2000 | Sandstrom et al. | |
| 6,467,972 B2 * | 10/2002 | Setoguchi | 385/88 |
| 6,752,537 B2 | 6/2004 | Clarkin et al. | |
| 6,883,975 B2 * | 4/2005 | Clarkin et al. | 385/78 |
| 7,099,533 B1 * | 8/2006 | Chenard | 385/31 |
| 2004/0151431 A1 * | 8/2004 | Ukrainczyk | 385/33 |
| 2005/0244101 A1 * | 11/2005 | Kitabayashi et al. | 385/33 |
| 2006/0115219 A1 * | 6/2006 | Mudd et al. | 385/62 |

* cited by examiner

*Primary Examiner*—Brian Healy
*Assistant Examiner*—Guy G Anderson
(74) *Attorney, Agent, or Firm*—Townsend and Townsend and Crew LLP; Kenneth R. Allen (57) ABSTRACT

A monolithic ferrule/endcap/optical fiber structure is provided wherein an optical fiber is terminated in a ferrule and bonded by fusion to form a monolithic unit which minimizes optical loss and is typically capable of transmitting high power laser radiation, preferably on the order of 500 W and higher, without damage to the optical fiber and ferrule. Ferrule, endcap, optical fiber and fusible powder are composed of material of substantially the same physical characteristics such that, when all are fused together, the structure so formed is monolithic and the optical path is transparent.

19 Claims, 4 Drawing Sheets

MONOLITHIC MODE STRIPPING FIBER FERRULE/COLLIMATOR AND METHOD OF MAKING SAME

CROSS-REFERENCES TO RELATED APPLICATIONS

NOT APPLICABLE

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This invention relates to optical energy transmission technology and more particularly to fiber ferrules suitable for terminating optical fibers and mode stripping as may be useful with high power laser radiation transmission. The invention further relates to lensed fibers and collimators. Moreover, the invention also concerns methods of manufacturing such ferrules and lenses.

The flexibility and light weight of fiber optic cables make them well suited for delivery of high power laser beams in applications such as robotics. Since they can be readily fused in an interface to the output of high power fiber lasers, fiber optic cables are also useful for optical energy delivery, particularly beam delivery.

Optical fibers are normally constructed of at least a core, at least one cladding surrounding the core and a polymer overcoat to mechanically protect and strengthen the optical fiber. The refractive index of the core is slightly higher than the surrounding cladding such that optical radiation launched into the core is confined due to the lower index of refraction of the cladding. The higher index of the core can be uniform, a so-called "step index core" fiber, or the refractive index may vary across the cross-section, being a maximum at the center of the core in a so-called "graded index core" fiber. The protective polymer coating is purposely made with a high refractive index such that any light propagating within the cladding circumference (i.e. "cladding mode") is dispersed into the polymer overcoat and thus removed from the fiber.

In practical usage, some fraction of light focused into a fiber will not be guided by the core. This can be due, for example, to mismatch of beam parameters into the fiber, focusing lens imperfections and dust/imperfections on optical surfaces. The component of the incident radiation that is not coupled into the core will propagate within the cladding until it diverges to the protective polymer coating where it is removed ("stripped"). If the source of laser radiation input into the fiber is a high power laser, the intensity of radiation within these cladding modes is readily capable of burning the protective polymer coating and destroying the fiber. An example is laser radiation onto industrial workpiece targets (particularly metallic targets) that is reflected with substantial power back toward the fiber such that radiation couples into the cladding circumference rather than into the core of the fiber. For this reason it is necessary to remove any cladding mode radiation at all fiber terminations before it can possibly diverge to and destroy the protective polymer coating. "Mode stripping" is the name given to the numerous techniques used to remove such cladding modes.

The purity of the fused silica fiber optic cable production process allows fiber so manufactured to contain and transmit very high power radiation. However, surface imperfections and contaminants at terminations of the fiber cause the power threshold at which damage occurs to be greatly reduced. For this reason it is preferred that the cross sectional area of the transmitted power within the fiber, the "mode size," be increased at fiber terminations. This is commonly achieved either by expanding the core of the fiber ("thermally expanded core fiber") or by arc fusion splicing a length of coreless "endcap" fiber of similar outside diameter to the end of the fiber optic cable at the fiber terminations. The use of an endcap allows for much larger mode sizes at the fiber termination than those achieved by expanded core techniques. A large mode at the output end of an endcap also ensures geometrically that a very low amount of reflected radiation from this surface can couple back into the fiber as feedback without the need for an angled surface—an important practical feature in many instances. An endcap is therefore a desirable feature of any high-power fiber termination.

The small diameter (e.g. 125 μm) and high flexibility of typical silica fibers require that fiber optic termination be held in a mechanically rigid structure at termination points in order to be practically useful in precise beam delivery systems. Due to the very low thermal expansion coefficient of fused silica (0.5 ppm) the choice of materials for such a mechanical structure is limited. Additionally, for example, the core of typical single mode 1060 nm wavelength compatible fiber is only 6 μm in diameter—a very small target that requires exceptional mechanical stability in order to maintain optical alignment over expected environmental conditions. Ideally such a mechanical structure would be made of fused silica itself for perfect temperature stability. Such a mechanical structure often takes the form of a ferrule—a rod-shaped part that is typically about 1 mm or more in diameter with an inner hole precisely manufactured to just accept the optical fiber within a tight tolerance. Typically optical fibers are cemented into such ferrule structures. In practice some fraction of incident laser radiation will be incident upon such adhesive bonds. When radiation from high power lasers is incident upon such ferrule end, sufficient energy may be absorbed in this bond layer to burn the adhesive and destroy the ferrule structure. Thus, a bond that does not require an adhesive is desired. To minimize transmission losses and reflected power, it is desirable to apply an antireflective coating to the end of the fiber termination. The integrity of the antireflective coating is important, and a structure is needed in which the coating is not damaged by cladding mode or mode stripped radiation. For all of the above reasons, it is desirable that any such fiber termination minimize transmission losses and reflected power, and more particularly a ferrule structure is needed that maximizes the net transmission of energy through a fiber junction.

It is often desirable to be able to produce a collimated output beam at fiber terminations. Transmitting output of a fiber through a Faraday Isolator or other component, and then focusing it back into another optical fiber is an example. In such cases, it is necessary to have well-controlled beam parameters (beam diameter and waist location) in order to achieve high fiber-to-fiber beam coupling.

The foregoing background sets forth problems of the prior art. The following patents are believed to represent a reasonable summary of prior art approaches to the some of the foregoing problems, although the invention hereinafter explained is to be recognized as a non-obvious improvement thereon.

U.S. Pat. No. 4,737,006 discloses a fiber termination composed of a silica rod arc fusion spliced to an optical fiber where a lens is formed onto the end of the silica rod with, preferably, an electric arc. The lens end is disposed adjacent to a mirror such that an optical signal transmitted down the optical fiber is reflected back into the fiber when the lens is optimally formed—terminating the electric arc heat treatment. Although such an arrangement has a desirable fused silica monolithic structure, it has no provision for mode stripping. Additionally, when applied to conventional small diameter fiber, the lens radius of curvature is necessarily very small. Both of these considerations make the previously disclosed collimator unsuitable for laser power levels in excess of a few watts.

U.S. Pat. No. 6,033,515 discloses use of a $CO_2$ laser to fuse a fiber to a comparatively large cross section optical component (e.g., a lens). Although the patent discloses a monolithic structure, it is an inherently weak structure that requires an adhesive to strengthen the fiber to lens bond. It is also fatally flawed. It does not have any provision for mode stripping capability, laser power that does not couple into the core will be absorbed in the adhesive, ultimately destroying the device. Additionally the lens disclosed is of a fixed focal length and thickness, making the critical adjustment of beam size and waist location difficult to achieve with the desired precision.

U.S. Pat. No. 4,678,273 discloses various ways of applying a covering over the optical fiber cladding (after removal of the protective polymer coating), which effectively strip cladding modes into further outer absorptive layers. Alternate structures are as effective. For example, optical fiber constructed with large diameter cladding would achieve many of the objectives of this invention. The patent does not disclose any monolithic mechanical structure and does not include an endcap. Absorption of cladding modes in the absorptive layers discussed would tend to heat the device, making mechanical alignment stability problematic. If water were to cool the portions of the device that have exposed cladding only, it would be would be problematic. Water is known to spontaneously cleave bare fiber through attack of defect sites ("Griffiths micro-cracks")—especially if the fiber is stressed in any way. All of the above render the disclosed invention incomplete and unsuitable for use with very high power laser beams.

U.S. Pat. No. 4,575,181 discloses removal of the polymer cladding in a region near the termination of an optical fiber exposing the cladding layer. The surface of the exposed cladding is formed into a rough surface which effectively mode strips cladding modes onto a mechanical holder. The holder supports and contains a suitable length of the end of the fiber in relation to a focus lens mounted to one end of the holder. This patent does not disclose endcaps and is not a monolithic structure. Any thermal expansion mismatch would contribute to instability in the optical alignment of the structure—especially when the mechanical holder absorbs high power. Etching the fiber to cause cladding modes to be stripped as disclosed renders it susceptible to cleaving, especially if it is mechanically stressed in any way. The mechanical housing makes the device bulky in practice, and difficult and expensive to manufacture.

U.S. Pat. Nos. 6,752,537 and 6,883,975 disclose a fused silica ferrule bound to an optical fiber via a layer between the two and having a softening temperature lower than the ferrule and fiber, or having a greater absorption of radiation than the ferrule and fiber. This creates a sealed region between the ferrule and fiber, but it is not of strictly monolithic composition because the disclosed layer needs to be doped heavily enough relative to the fiber and ferrule to substantially change its thermal properties. Importantly, they also provide no means for mode stripping.

U.S. Pat. No. 5,619,602 discloses a silica rod of larger diameter than the optical fiber fused to the end of the fiber. This rod is intended to direct rays entering outside the fiber onto an annular reflector which surrounds the fiber, the reflector deflecting the rays onto an absorbing, heat sinking metallic housing surrounding the assembly. A temperature sensor on the reflector protects the assembly from damaging levels of radiation. A capillary tube in optical contact with the fiber cladding also strips cladding modes between the silica rod and the annular reflector onto the housing inner wall. This invention appears difficult to practice with small diameter fiber due to difficult and fragile assembly and evident susceptibility to vibration modes of the mode stripper capillary. Although the invention can, with detailed engineering, perform all of the desired optical fiber termination functions, it is realized in a long, bulky and expensive device, rendering it impractical in many applications.

U.S. Pat. No. 6,167,177 discloses water cooling of an optical fiber termination. A bare end of optical fiber is in optical contact with a transmissive window. The window and fiber are surrounded by a sealed, absorbing housing. In one embodiment, water flows in the space between the optical fiber and the housing. Laser radiation is coupled into the fiber through the window. Radiation that does not couple into the fiber in any way is absorbed in the water and at the water cooled housing surface. Cladding modes can be stripped by using an additional optically contacted capillary tube that is suspended within the structure by the fiber itself or by roughening the cladding surface of the fiber by diamond grinding or chemical etching means. It may be observed that either method of mode stripping is problematic with regard to reliability. Both mode stripping means have bare fiber in contact with water, potentially allowing spontaneous cleavage at defect sites, especially for the disclosed roughened surface approach. Additionally suspending the capillary mode stripper by the fiber itself does not appear robust with respect to shock and vibration modes—at least for small diameter fibers. An alternative embodiment surrounds the fiber with a transparent tube sealing and protecting the fiber from contact with the cooling water. However, since an air gap exists between the transparent tube and the fiber no mode stripping function is performed.

It is thus seen that all known prior art techniques, devices and inventions have specific and general disadvantages for which solutions have not been suggested by the prior art.

SUMMARY OF THE INVENTION

According to the invention, a monolithic ferrule/endcap/ optical fiber structure is provided wherein an optical fiber is terminated in a ferrule and bonded by fusion to form a monolithic unit which minimizes optical loss and is typically capable of transmitting high power laser radiation, preferably on the order of 500 W and higher, without damage to the optical fiber and ferrule.

According to one aspect of the invention, a short length of undoped coreless fiber ("endcap") is fusion spliced (e.g., by arc fusion or laser) to an optical fiber end of smaller diameter (i.e., with its protective polymer coating removed prior to splicing) prior to mating with a ferrule. Any optical fiber type that can be fusion spliced to a suitably larger diameter endcap can be used. Examples include single mode fiber, polarization-maintaining fiber, multi-mode fiber, polarizing fiber, large mode area fiber, double clad fiber, photonic crystal fiber and jacketed air clad fiber. For high resistance to optical damage, the length of the endcap is selected such that light diverging out of the optical fiber core will be substantially contained within the diameter of the endcap. To this length is added an additional short length for processing. In order to provide mechanical strength for the fiber termination the fused endcap and optical fiber are slid into a ferrule having an inner diameter precisely dimensioned to just allow for a slip fit of the larger endcap fiber. The ferrule, endcap and optical fiber are chosen to be of substantially identical high transmissivity material composition and thermal properties. The desired endcap length is kept within the ferrule, with an additional small length that protrudes from the ferrule end—about 1 mm (more or less, depending upon the coreless stub diameter and tolerance of fit into the ferrule) when initially inserted. Thereafter a localized heat source, such as a laser of sufficient power to melt the fiber, is used to melt the protruding endcap fiber back onto the ferrule. This may be done by focusing the laser radiation axially onto the end of the endcap.

Polishing and anti-reflection coating the end-face of this monolithic structure allows radiation to be coupled into and out of the optical fiber core with low loss. As the endcap design diameter is increased, the beam size of this radiation on the end-face of the ferrule structure also increases, thereby increasing the optical damage limit of this termination and reducing coupling of any reflection back into the core of the optical fiber (i.e., "Return Loss"). If additional reduction of Return Loss is desired the end-face of the monolithic ferrule structure may be angle polished as required. In order to prevent cladding modes from burning the optical fiber protective polymer coating during high power operation, the coating needs to be stripped within the ferrule structure, which leaves a void between the inner diameter of the ferrule and the outer diameter of the fiber. According to the invention, this void is filled by placing in the ferrule a powder that has a higher refractive index than that of the fiber cladding. The powder is also chosen to have a similar thermal expansion coefficient, but a lower softening temperature, than the ferrule material. The powder may be melted with a localized heat source, such as a laser, to increase optical contact with the optical fiber and ferrule. Bubbles/voids will result in the melted powder regions which cause diffuse scattering of the mode stripped cladding modes. The ferrule length is required to be long enough to ensure that all cladding mode energy ultimately diverges to the cladding of the optical fiber such that it can then be removed by the melted powder mode stripping region. Radiation scattered in the mode stripping region or entering the ferrule directly that has a high angle of incidence on the outer diameter surface of the ferrule will be totally reflected at this surface and guided along the ferrule length. In accordance with the invention, this radiation is reflected out of the ferrule structure at the optical fiber end through a flaring at the end of the ferrule and interaction with a reflective coating applied to the surface of the flaring. With substantially all cladding mode radiation removed, a transmissive adhesive is provided that strain relieves the optical fiber and a transmissive polymer adhesive/coating is applied, recoating any uncoated optical fiber at the flared end of the ferrule structure. Radiation which is not launched into the fiber core is thereby either scattered or reflected away from the monolithic ferrule structure, where it can be absorbed by heat dissipative and conductive materials, such as metal acting as a heat sink.

According to another aspect of the invention, a laser is used as a tool to form a lens directly onto the end of the monolithic ferrule structure to achieve a substantially collimated beam out of the ferrule structure thereby forming a monolithic fiber collimator. To facilitate the formation of the endcap lens of desired size and shape, the ferrule diameter, the length of the protruding endcap prior to fusion/melt back, and the size/shape of the laser radiation focused on the endcap are selected as required. Careful control of the focused laser size, shape and time varied power in relation to the ferrule diameter and endcap protrusion length determines the form of an aspherical lens. Alternatively, or additionally, a sharply focused laser can be scanned across the ferrule end to facilitate the formation of an aspherical lens surface. To form a lens of the desired focal length, a mirror that is transmissive to the melting laser (e.g. a $CO_2$ laser) is disposed at the desired collimator waist location. Radiation suited to the fiber application is launched down the optical fiber. Reflected power of this particular radiation from the mirror at the desired waist location is monitored with a tap in the optical fiber as the melting laser radiation is applied. When the optimal lens has been formed the melting laser is turned off. In a similar manner, other desired lens powers can be formed for non-collimated beams.

In accordance with another aspect of the invention, a ferrule structure is provided so that high power laser sources can be used with polarizing fiber, such as Corning Single Polarization SP 1550 Fiber. Single polarization fiber rejects the undesired polarization into the cladding, where it is stripped by its polymer cladding. Since in high power applications, the polymer cladding can be damaged by the heating caused by stripping, a suitably long mode-stripping ferrule of the present invention is used to strip the initial highest power rejected polarization down to a level such that any residual rejected polarization does not burn the polymer cladding. Such a polarizing stripping ferrule can be used anywhere as desired, either at the fiber termination with a larger endcap, or elsewhere along the fiber if the single polarization fiber is fusion spliced to polarization maintaining fiber of larger cladding dimension (large enough for the mode stripping powder to fill a gap between the single polarization fiber and the ferrule).

The invention can be applied in a number of configurations. In the case of extremely high laser power, the space between the monolithic ferrule and the metallic housing may need to be liquid (i.e., water) cooled. Further, active core double clad fiber is commonly used with fiber lasers. Using a larger diameter endcap with such fiber in a mode stripping ferrule results in removal of radiation in the outer cladding (such as pump light that is not confined to the inner cladding). Then, after pumping an active (e.g. Ytterbium doped) core, uncoupled fiber laser signal radiation and unabsorbed inner cladding pump light can be stripped from the inner cladding separately with a remote mode stripping ferrule according to the invention. The remote mode stripping ferrule can be water cooled if required. In the remote mode stripping ferrule, the double clad fiber is spliced to single clad fiber of matching core size, and a termination between a single clad fiber which has a diameter that matches the inner cladding diameter of the double clad fiber is constructed similarly to the fiber termination ferrule discussed above. A bidirectional mode stripping ferrule can also be made by splicing double clad fiber to each end of an appropriately long single clad fiber (sized to ensure cladding modes are fully stripped) and using a ferrule with two fluted ends slid over this single clad fiber length. Mode stripping melted powder is used in the region between the double clad fibers. Both fluted ends are coated with a reflective coating to remove any ferrule guided radiation. "Jacketed air clad fiber" and photonic crystal fiber can be used in place of conventional double clad fiber leading to the remote single clad fiber mode-stripping ferrule. In such cases, the single core fiber may be large mode area fiber with a mode field diameter consistent with these fiber types.

Another application of the invention is use with double clad fiber, where the double clad optical fiber is used to confine cladding modes of the inner cladding and prevent them from burning the fiber polymer protective coating. This configuration requires that any radiation not coupled into the core be confined to the inner cladding region only. Because the outer cladding confines inner cladding modes, the double clad fiber can be made as long as desired, allowing for an inner cladding mode stripping ferrule according to the invention to be located remote from the fiber termination. This can be particularly useful for very high power if water-cooling of the mode-stripping ferrule is impractical or undesirable at the fiber termination. The endcap and double clad fiber can be the same diameter, and the termination ferrule/collimator structure can be relatively short, since the mode stripping occurs in the remote mode stripping ferrule. "Jacketed air clad fiber" and photonic crystal fiber can also be used in place of conventional double clad fiber. In such cases, the single core fiber may be large mode area fiber—with a mode field diameter consistent with these fiber types.

The invention is not limited to any one type of material. For example, active core (e.g. Ytterbium doped) single or double clad polycrystalline ceramic fiber (e.g. Yttrium Aluminum Garnet "YAG" or Yttria) could find use for very high power (short) fiber lasers and amplifiers and may find prominent usage when fully developed. Glass ceramic materials may also be used. All that is required for the present invention to work is that the fiber, endcaps and ferrules be highly transmissive and of the same material or be of the same mechanical and thermal properties. The mode stripping powder can typically be of a lower melting glass with composition adjusted such that it has a higher index of refraction, lower softening temperature and similar coefficient of thermal expansion to the ferrule structure.

The invention will be better understood upon reference to the following detailed description with the accompanying drawings.

DETAILED DESCRIPTION OF THE INVENTION

Figure 1:
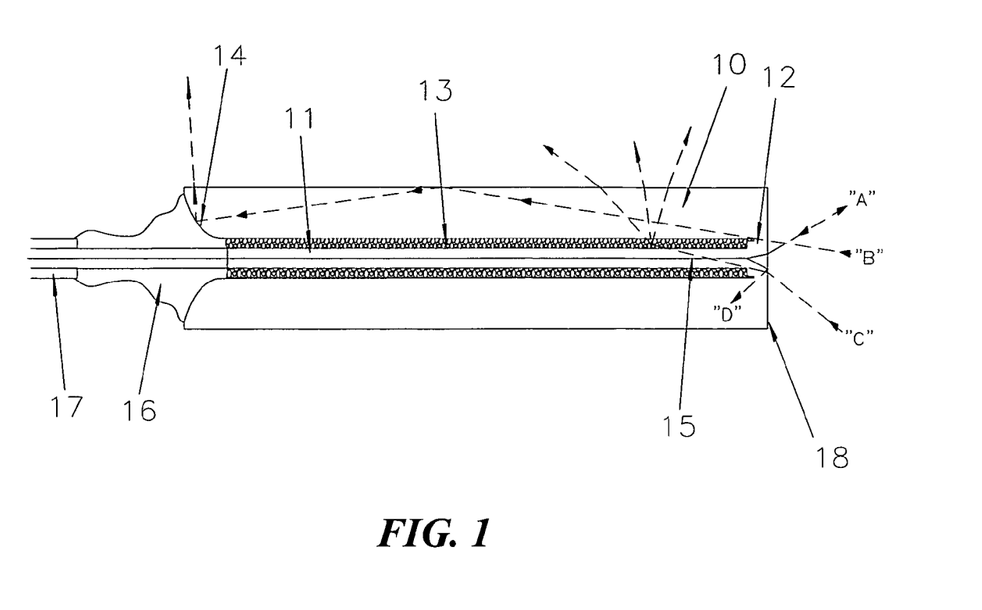
FIG. 1 is a cross-sectional view of a first embodiment of monolithic mode stripping ferrule according to one embodiment of the invention.

Referring to FIG. 1, one embodiment of the invention is illustrated in a cross-sectional diagram. A fiber optic junction is provided by the combination of a fused silica ferrule 10 that has an inner diameter fabricated to a high tolerance to just accept a fused silica coreless fiber stub "endcap" 12 (FIG. 2, not to scale) centered within the ferrule 10, and a stripped silica optical fiber 11 with core 15 that is disposed within the ferrule 10 and fused to the endcap 12. By coreless, it is understood to mean a substantially homogeneous element such as a glass fiber that has not been prepared with a core material of fiber. By stripped, it is understood that the polymer coating 17 or jacket has been removed from the outer surface of the fiber in the stripped region. The outer diameter of the stripped region of the optical fiber 11 is sufficiently less than the inner diameter of the ferrule 10 to allow an appropriately fine silica glass powder 13 to occupy and fill the space between the optical fiber 11 and the ferrule 10. For fused silica fibers and ferrules, a glass powder with a low coefficient of thermal expansion (e.g. <1.5 ppm) and reasonably low (<1200° C.) softening temperature is preferably used. A reflective gold coating 14 is deposited on a flared (countersunk) end of the ferrule to reflect light out of the ferrule, thereby protecting a resilient adhesive 16 from excessive and damaging optical radiation. The resilient adhesive 16 is extended at least up to the polymer coating 17 originally on the optical fiber 11 in order to environmentally protect the fiber and strain relieve any bends. Polishing and anti-reflection coating of an optical face 18 at the end completes the ferrule structure.

In a specific example, the optical fiber 11 is 125 µm diameter HI1060 fiber from Corning (Corning, N.Y.), which is a single mode fiber at 1060 nm. A suitable fiber endcap 12, which allows powder 13 to fill the space between the optical fiber 11 and the ferrule 10, is 250 µm diameter fused silica fiber, which may be very lightly doped such that the refractive index of the endcap 12 precisely matches the peak index of refraction of the core 15 of HI1060 optical fiber. In order to ensure that radiation entering and exiting the ferrule travels only through optically pure endcap material (and thus has maximum immunity to damage due to optical effects) the endcap length is about 1.5 mm for use with HI1060 fiber. This will give a mode diameter of approximately 170 µm at the $1/e^2$ intensity points at the output surface of the finished ferrule. Other endcap lengths (longer and shorter) are possible if maximum damage immunity is not required. In the FIG. 1, ray "A" is an example of an optical ray that can either couple into or radiate from optical fiber core 15. A reflection from a metal work piece such as represented by ray "B" which misses the optical fiber 11 completely, is totally internally reflected at the surface of ferrule 10, and then reflected out of the ferrule assembly by the reflective coating 14 at the opposite end of the ferrule 10. Optical ray "C" is an example of a ray entering the ferrule assembly that misses the optical fiber core 15, and then is diffusely scattered out of the ferrule assembly in the mode stripping region. Output ray "D" from the fiber core is weakly reflected at the anti-reflection coated surface 18, illustrating how the length of a larger diameter type endcap helps to geometrically reduce feedback (i.e. "return loss") from surface 18 back into the optical fiber core 15.

Figure 2:
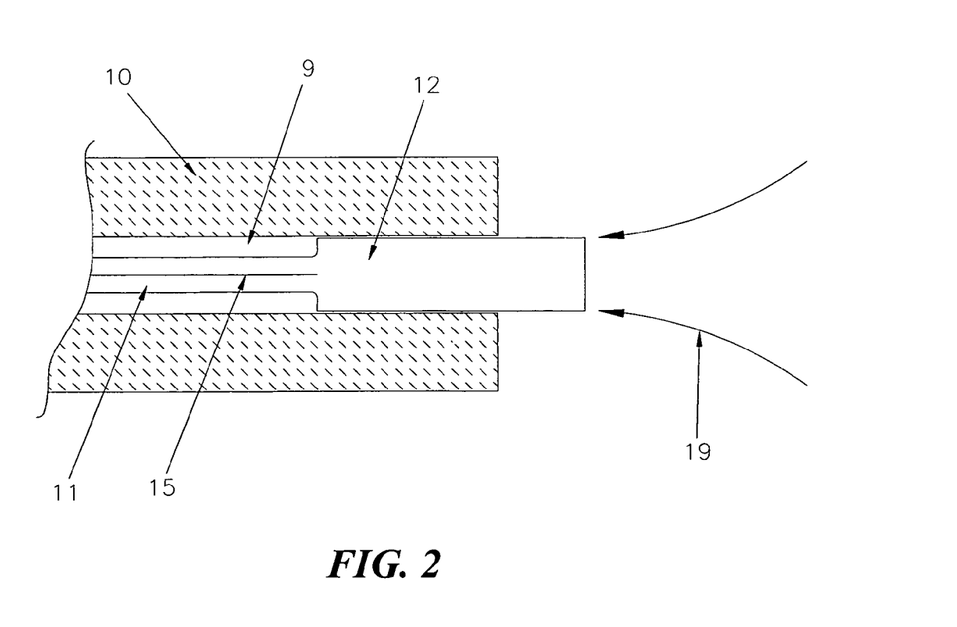
FIG. 2 is an expanded cross-sectional view of a coreless stub and ferrule end prior to fusion in accordance with the invention.
Figure 3:
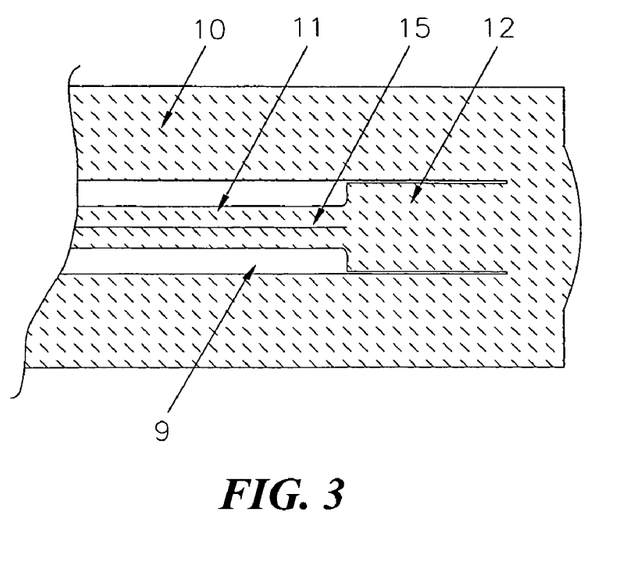
FIG. 3 is an expanded cross-sectional view of a portion of a ferrule end after fusion in accordance with the invention.

In order to form a monolithic structure, the length of the endcap 12 is cleaved to be longer than required for the finished ferrule (FIG. 2). This additional length is allowed to protrude beyond the ferrule end as shown in FIG. 2. To complete fabrication, laser radiation 19, such as from a $CO_2$ laser, is focused upon the end of the fiber, namely on the protruding part of the endcap 12. The laser radiation 19 is absorbed, melting the endcap 12 back to the ferrule 10 as shown in FIG. 3 where the endcap and ferrule are completely fused together forming a monolithic structure, as represented by the continuous cross section.

Prior to application and curing of adhesive 16 (FIG. 1), the powder 13 is loaded into void 9 (FIGS. 2 and 3) and melted to form good optical contact with both the optical fiber 11 and encircling ferrule 10. A laser source, such as a $CO_2$ laser, either directed along the central axis of the ferrule 10 or directed from the side of the ferrule 10 and scanned along the ferrule length, can be used to melt powder 13. The laser source is turned off sufficiently prior to the adhesive end of the ferrule 10 such that the optical quality and mechanical integrity of the optical fiber is not compromised (i.e., by melting of the core or coating). The reflective coating 14 is typically applied prior to fabrication of the ferrule structure. (It could be applied any time before the adhesive is applied.) After application and cure of the adhesive 16, the exposed end of the ferrule structure is polished, and then it is anti-reflection coated in the wavelength region of 1060 nm.

Figure 4:
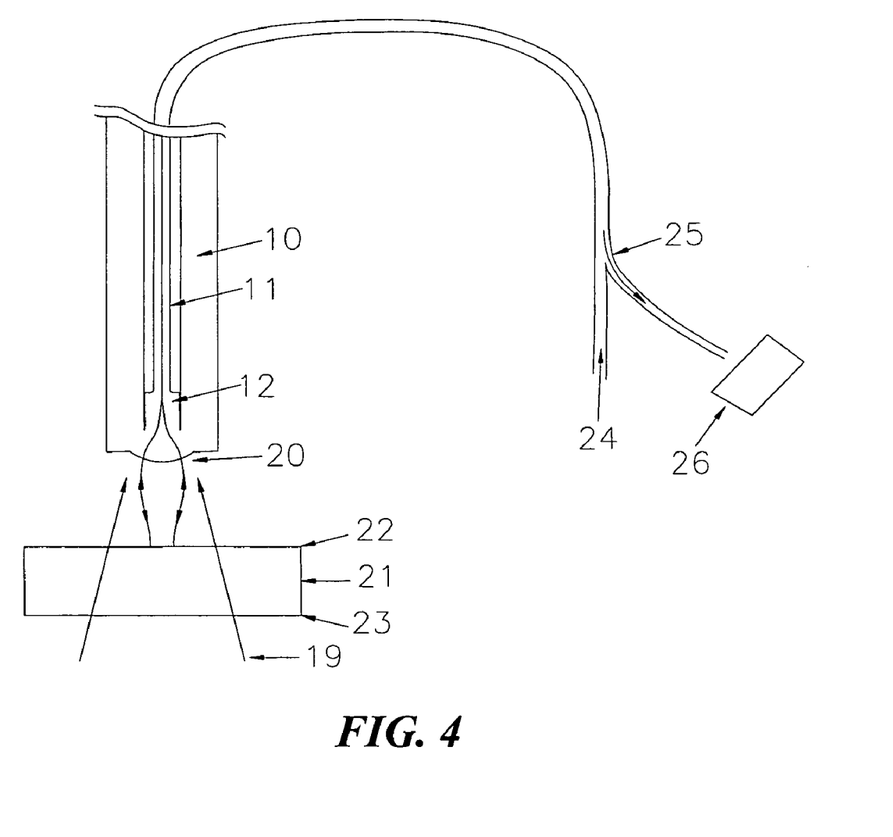
FIG. 4 is a diagram of an apparatus used in one embodiment of a method according to the invention for forming a collimating lens on the end of ferrule, showing an expanded cross-sectional view of the ferrule end in accordance with the invention.

FIG. 4 illustrates how a high power, mode stripping monolithic collimator can be formed according to the present invention. Ferrule 10, optical fiber 11 and endcap 12 are according to the invention as described above. Precise control of the protruding endcap length, $CO_2$ laser beam size and shape 19, and ferrule diameter permits the formation of an aspheric lens 20. A flat mirror substrate 21 is transmissive at the $CO_2$ laser wavelength, permitting a laser beam to pass through the substrate and impinge on the end of the ferrule 10. It is anti-reflection coated for the $CO_2$ laser wavelength on source side surface 23. A further coating on workpiece side 22 is provided which has been designed to be reflective at the fiber wavelength (e.g. 1060 nm) but transmissive at the $CO_2$ laser wavelength. Flat mirror surface 22 is placed to fix the desired waist location of the desired collimated beam. A collimator test laser source 24 is directed into one arm of a fiber tap coupler 25. Reflected light from mirror surface 22 is monitored with a detector 26. The $CO_2$ laser source power 19 is used to heat the ferrule end, causing it to soften and expand out from the ferrule 10 along its central axis. When the appropriate lens 20 is formed the $CO_2$ laser source power 19 is reduced as appropriate.

Figure 5:
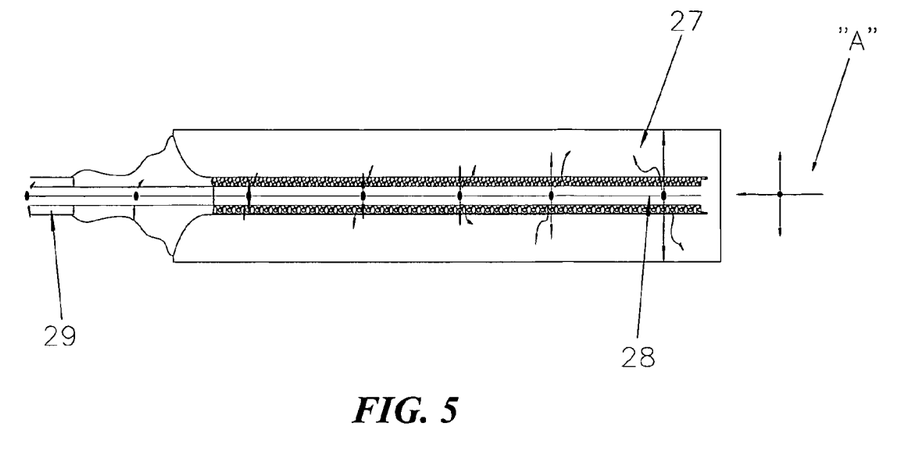
FIG. 5 is a cross-sectional view of a mode-stripping ferrule used with single polarization fiber in accordance with the invention.

FIG. 5 depicts how the present invention can allow single-polarization-type fiber to be used with a mode stripping monolithic ferrule at high power. The orthogonal polarization components of incoming radiation "A" into the fiber core 28 are shown as double arrowheads for the polarization plane in the paper and as points or dots for the polarization plane normal to the paper plane. The transmission plane of the single polarization fiber is normal to the plane of the paper (dots). As shown, the rejected polarization in the plane of the paper (double arrow heads) is progressively stripped and attenuated as the light propagates into the ferrule structure. The length of the ferrule 27 is chosen such that the residual level of in-plane (rejected) polarization is sufficiently low so as to have no possibility of damaging the single polarization polymer cladding 29.

Figure 6:
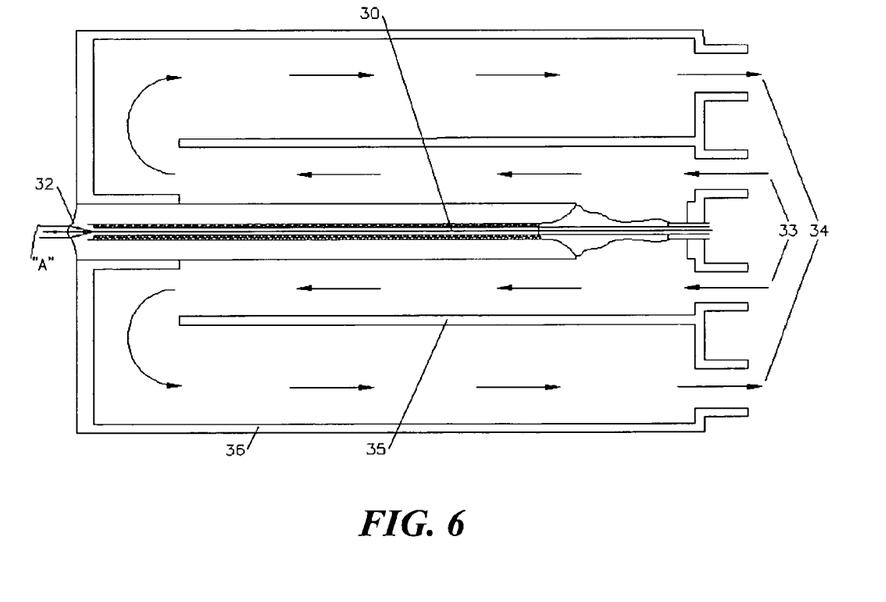
FIG. 6 is a cross-sectional view of a double clad fiber with an endcap in a first outer cladding mode stripping fiber termination and which shows a cross-sectional view of a casing for water-cooling the termination region in accordance with the invention.

FIG. 6 shows an embodiment of the present invention in an application using a collimating monolithic mode-stripping ferrule with active core double clad fiber (as in a fiber laser) and provided with water cooling. The ferrule structure is similar to FIG. 4. Incoming pump radiation from laser diode "A" is focused into the inner cladding of the double clad fiber 30 by means of lens 32. The annular casing 36 of the water cooling manifold is typically an absorbing metal material which can be hermetically bonded to the monolithic collimating ferrule. Any bonding method that ensures a rigid water-tight seal among these components can be used, for example glass solder. The annular water inlet manifold 33 provides uniform cooling along the length of the cylindrical structure. A heat absorbing annular baffle 35 directs the water flow first across the collimating ferrule structure and then out the annular output manifold 34. Any pump light that is not focused into the inner cladding is thereby stripped from the double clad fiber before it can burn the polymer cladding.

Figure 7:
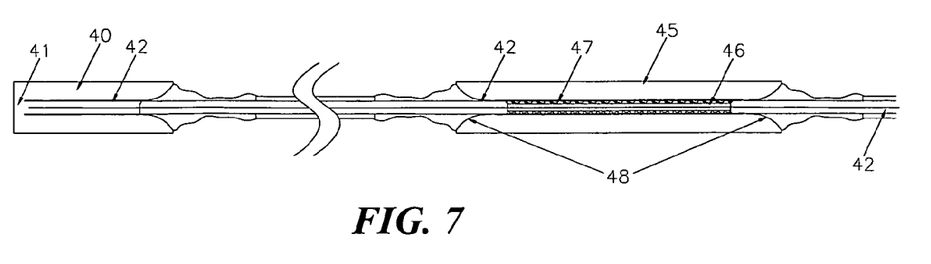
FIG. 7 is a cross-sectional view of a compact termination double clad fiber non-mode stripping ferrule with an endcap and of a remote bi-directional single clad fiber mode-stripping ferrule in accordance with the invention.

FIG. 7 illustrates an embodiment of the invention in an application using a compact termination double clad fiber non-mode stripping ferrule 40 and a remote single clad fiber bidirectional mode stripper. This embodiment requires all incident radiation to fall only within the inner cladding region. Ferrule 40 only needs to be as long as required to mechanically hold and mount it, since no mode stripping takes place in this ferrule 40. Endcap 41 and double clad fiber 42 can be similar in diameter. Double clad fiber 42 is fusion spliced to both ends of a suitable length single clad fiber 46. Mode stripping powder 47 is loaded into a double end fluted ferrule 45 and melted with a $CO_2$ laser. Both fluted ends are given a reflective coating 48.

The invention has been explained with reference to specific embodiments and applications. Other embodiments will be evident to those of ordinary skill in the art upon reference to this description. It is therefore to be understood that the invention is not to be limited, except as indicated by the appended claims.

What is claimed is:

1. An optical fiber termination suitable for use with high power laser radiation carried in an optical fiber, comprising:
   an endcap of coreless fiber; and
   an annular ferrule disposed about said endcap;
   said endcap being fused to said ferrule without adhesive, and said endcap being fused to said optical fiber without adhesive, wherein said endcap, said ferrule and said optical fiber are composed of substantially the same material to form a materially homogeneous all monolithic structure.

2. The optical fiber termination of claim 1 wherein said optical fiber is selected from: single mode fiber (SMF), multi-mode fiber (MMF), polarization maintaining fiber (PMF), single polarization fiber (SPF) and large mode area fiber (LMAF), polarizing fiber, double clad fiber, jacketed air clad fiber and photonic crystal fiber.

3. The optical fiber termination of claim 1 wherein space between said ferrule and said optical fiber is filled with a fused transparent material.

4. The optical fiber termination of claim 1 wherein said optical fiber is a double clad fiber that fits snugly within the ferrule.

5. The optical fiber termination of claim 1 wherein said optical fiber has a cladding that defines an outer diameter and said annular ferrule defines an inner diameter, said ferrule inner diameter being larger than said optical fiber with cladding outer diameter such that said ferrule and said optical fiber form an annular region between said ferrule inner diameter and said optical fiber outer diameter and wherein said annular region is filled with a substantially non-absorptive material of a refractive index not less than the refractive index of the cladding and of a composition and a transparency substantially similar to said materially homogeneous monolithic structure.

6. The optical fiber termination of claim 5 wherein scattering sites are distributed within said non-absorptive material.

7. The optical fiber termination of claim 5 wherein the non-absorptive material is a fused non-absorptive powder that is melted and blended across said annular region to form randomly distributed voids that act as scattering sites within said non-absorptive material, such that radiation that impinges on cladding is scattered and thereby directed away from the optical fiber before it can impinge on any coating on said optical fiber beyond said ferrule.

8. The optical fiber termination of claim 7 wherein said non-absorptive powder has a lower softening temperature than said optical fiber, said coreless fiber and said ferrule but with a substantially similar thermal expansion characteristic, and that has been treated by a localized heat source to fuse said non-absorptive powder.

9. The optical fiber termination of claim 1 wherein said ferrule has a non-output end, said non-output end being skewed relative to a central axis of the ferrule on the optical fiber, said non-output end having a face with a reflective coating, such that ferrule-guided or mode-stripped radiation within said ferrule will be reflected away from any other coatings or materials which are outside of said ferrule.

10. The optical fiber termination of claim 1 wherein said coreless fiber is lightly doped to have a refractive index that precisely matches the peak refractive index of the core of said optical fiber.

11. The optical fiber termination of claim 1 wherein said coreless fiber, said ferrule and said optical fiber are composed of substantially non-absorptive materials having substantially identical mechanical and thermal properties.

12. The optical fiber termination of claim 1 wherein said ferrule and said optical fiber are enclosed in a water cooling jacket such that cooling fluid is in direct contact with said ferrule.

13. A method of manufacturing an optical fiber termination comprising the steps of:
    removing a portion of a jacket at one end of an optical fiber to form a stripped optical fiber portion; thereafter
    coaxially fusing without adhesive the stripped optical fiber to an endcap of coreless fiber, the endcap being larger in diameter than said optical fiber;
    inserting the endcap with the stripped optical fiber into an annular ferrule, said endcap protruding by small amount from a first end of said ferrule, said annular ferrule being a structural element; thereafter
    causing said endcap to fuse to said ferrule without adhesive;
    filling said ferrule with a fusible powder around said stripped optical fiber; and thereafter
    causing the powder to fuse with said ferrule and said stripped optical fiber to form a non-absorptive bond between said stripped optical fiber and said annular ferrule, said stripped optical fiber, said ferrule, said powder and said endcap being composed of substantially the same type of material such that the non-absorptive bond is monolithic with said optical fiber and said annular ferrule.

14. The method of claim 13 wherein said causing steps are effected by radiating by means of laser radiation through the axis of the endcap and stripped optical fiber.

15. The method of claim 13 wherein said powder-fusing causing step is effected by radiating from the side by means of laser radiation along the axis of the endcap and of the stripped optical fiber.

16. The method of claim 13 further including:
    forming a collimator lens of controlled waist location by heating said endcap.

17. An optical fiber mode stripping device for use with high power laser radiation carried in an optical fiber, comprising:
    an annular ferrule, said annular ferrule being flared at each end, said each being coated in its flared portion with a reflective coating, said annular ferrule being disposed around a length of the optical fiber that has been stripped of its jacket and extending sufficient length to dissipate laser radiation power captured in said annular ferrule; and
    a non-absorptive fusible powder disposed between said ferrule and s optical fiber, said non-absorptive fusible powder being fused to said optical fiber and to said ferrule as a non-absorptive bond without adhesive, wherein said ferrule, said non-absorptive fusible powder and said optical fiber are composed of substantially the same material to form an all monolithic structure.

18. The device of claim 17 wherein said ferrule is enclosed in a water cooling jacket.

19. An optical fiber termination suitable for use with high power laser radiation carried in an optical fiber, comprising:
    an endcap formed of a coreless fiber segment, said end of said optical fiber; and
    an annular ferrule disposed about said endcap and having an inner diameter conforming to said outer diameter of said endcap;
    said endcap being fused to said ferrule without adhesive, and said endcap being fused to said optical fiber without adhesive, wherein said endcap, said ferrule and said optical fiber are composed of substantially the same material to form a materially homogeneous all monolithic structure, wherein said ferrule extends around said optical fiber as a structural element supporting said endcap and being of sufficient length to dissipate laser radiation power captured in said annular ferrule, such that said monolithic structure is capable of sustaining at least the same level of laser radiation power without damage as said optical fiber.

* * * * *